United States Patent [19]

Barnett

[11] Patent Number: 5,724,693
[45] Date of Patent: Mar. 10, 1998

[54] APPARATUS FOR CLEANING EXTRUDER HEAD

[75] Inventor: Roger Barnett, Lorette, Tenn.

[73] Assignee: ACD Tridon Inc., Burlington, Canada

[21] Appl. No.: 636,756

[22] Filed: Apr. 19, 1996

[51] Int. Cl.[6] .................................................. B08B 9/00
[52] U.S. Cl. ............................ 15/104.05; 15/104.16; 425/227
[58] Field of Search .................... 15/104.001, 104.02, 15/104.03, 104.05, 104.095, 104.096, 104.11, 104.16; 425/225, 227, 229

[56] References Cited

U.S. PATENT DOCUMENTS

| | | | |
|---|---|---|---|
| 676,444 | 6/1901 | Paul | 15/104.05 |
| 1,238,269 | 8/1917 | Cornwell | 15/104.05 X |
| 1,523,754 | 1/1925 | Chippeaux | 15/104.05 |
| 1,553,034 | 9/1925 | Donnelly | 15/104.05 |
| 2,198,783 | 4/1940 | McAllister | 15/104.05 |
| 2,575,146 | 11/1951 | Thomas | 15/104.16 X |
| 3,143,302 | 8/1964 | Carlson et al. | 15/104.16 X |
| 4,234,541 | 11/1980 | Bredeweg et al. | 15/104.095 X |
| 4,488,515 | 12/1984 | Swallow | 15/104.05 X |
| 4,898,201 | 2/1990 | Conley et al. | 15/104.16 X |
| 4,962,566 | 10/1990 | Gemma | 15/104.095 X |

FOREIGN PATENT DOCUMENTS

| | | | |
|---|---|---|---|
| 85492 | 7/1965 | France | 15/104.095 |

*Primary Examiner*—Mark Spisich
*Attorney, Agent, or Firm*—Bacon & Thomas

[57] ABSTRACT

A hollow mounting hub is used to mount the tool to an extruder head and a plunger with a stop at one end extends longitudinally through the hub. The plunger reciprocates the plunger between a retracted position in which the plunger is housed in the hub and an extended position in which the plunger protrudes from the hub so that it may abut with extrudate lodged in an extruder head. Extrudate is dislodged in an extended position of the plunger with the stop remote from the mounting hub.

8 Claims, 3 Drawing Sheets

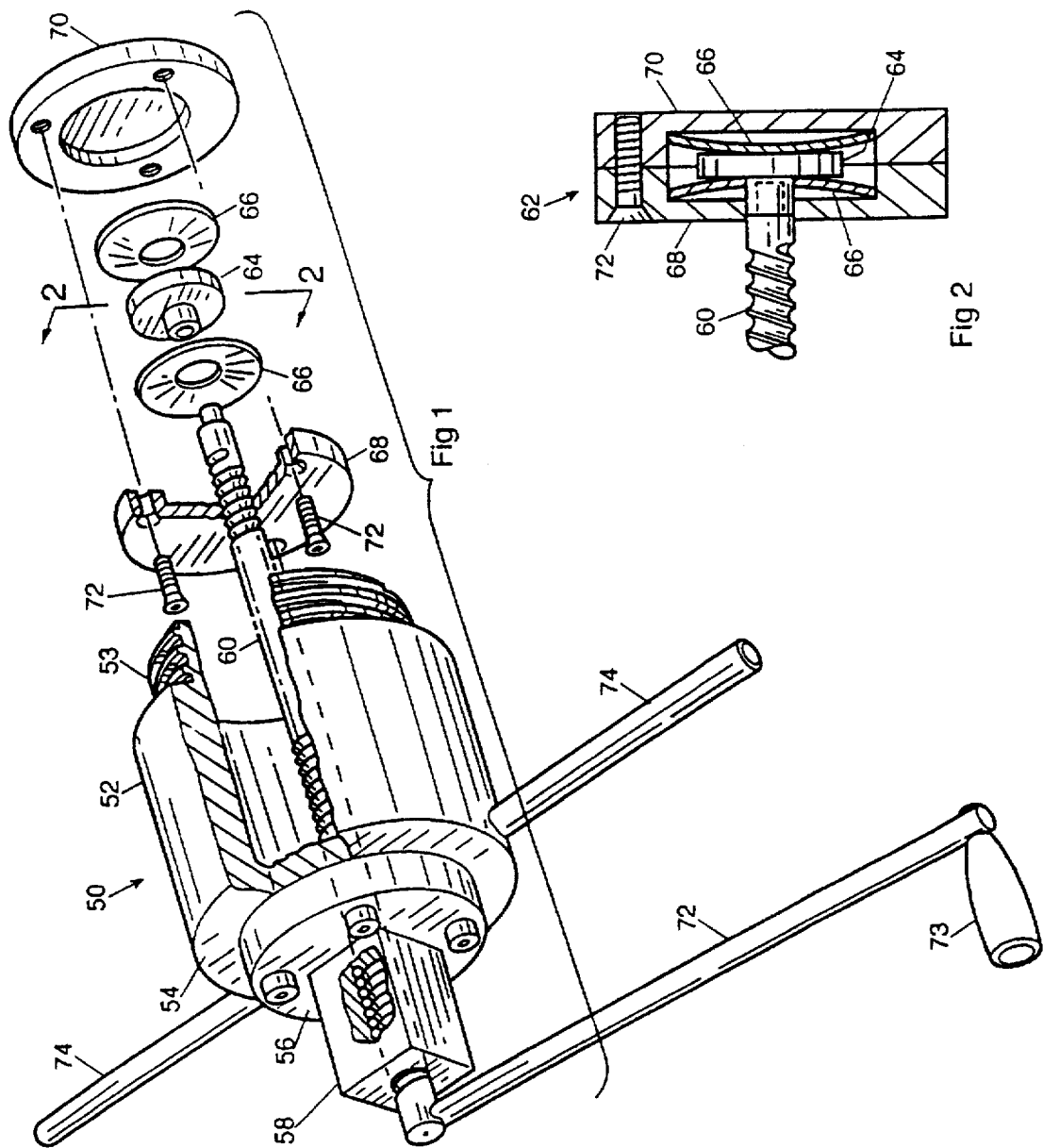

APPARATUS FOR CLEANING EXTRUDER HEAD

FIELD OF THE INVENTION

This invention relates to a tool for dislodging extrudate from an extruder head, the extruder head being used to hold a screen pack and an extrusion die downstream from a barrel in which raw material feed is brought to a plastic state. The plastic extrudate is fed to the extruder head where it emerges as an extrusion. The invention relates particularly to dislodging a rubber extrudate used in the fabrication of windshield wiper squeegees.

BACKGROUND OF THE INVENTION

During extrusion, raw material is fed to a barrel where it is heated to a plastic state and is conveyed from an inlet to an outlet, commonly in a spiral path. The feed material emerging from the barrel is referred to as the "extrudate" and it enters an extruder head where it is filtered, oriented and shaped. Periodically, the extrusion process must be interrupted and the extrudate allowed to cool so that the screens and extrusion dies may be removed for cleaning and servicing. In a rubber extrusion process, the extrudate solidifies as a cylindrical plug which is firmly lodged inside a cylindrical opening defined by the extruder head between a screen pack at the inlet and an extrusion die at the outlet.

In order to remove the plug of extrudate, it is common practice to separate the head from the barrel and to insert a crow bar into the opening of the extruder head at the inlet in order to pry the plug and the screen pack from the extruder head. The plug tends to conform very closely to the walls of the opening in the head and is very difficult to remove. The process may take up to one hour and this is wasted time which could be more profitably spent extruding more product.

The object of this invention is to provide a tool for removing the plug from the extruder head without the aforementioned disadvantages.

SUMMARY OF THE INVENTION

In accordance with the invention, the tool comprises a hollow mounting hub which is used to mount the tool to the extruder head; a plunger having a stop at one end which is mounted to a shaft that extends longitudinally through the hub; and thrust means to reciprocate the plunger between a retracted position in which the plunger is housed in the hub and an extended position in which the plunger protrudes from the hub so that it may abut with extrudate lodged in the head. The thrust means is used to dislodge the extrudate from the extruder head in an extended position of the plunger with the stop remote from the mounting hub.

Preferably, the mounting hub has a threaded end which will cooperate with a threaded opening provided in the extruder head and normally used to retain a die clasp. Most preferably, the plunger has a rotatable shaft and the stop comprises a thrust bearing so that the shaft may be rotated relative to the stop.

BRIEF DESCRIPTION OF THE DRAWINGS

In order that the invention may be more clearly understood, a preferred embodiment is described below with reference to the accompanying drawings, in which:

FIG. 1 is a perspective exploded view, partly cut away, showing a tool made in accordance with the invention;

FIG. 2 is a cross-sectional view taken on line 2—2 of the assembly;

DESCRIPTION OF PREFERRED EMBODIMENT WITH REFERENCE TO DRAWINGS

Figure 3:
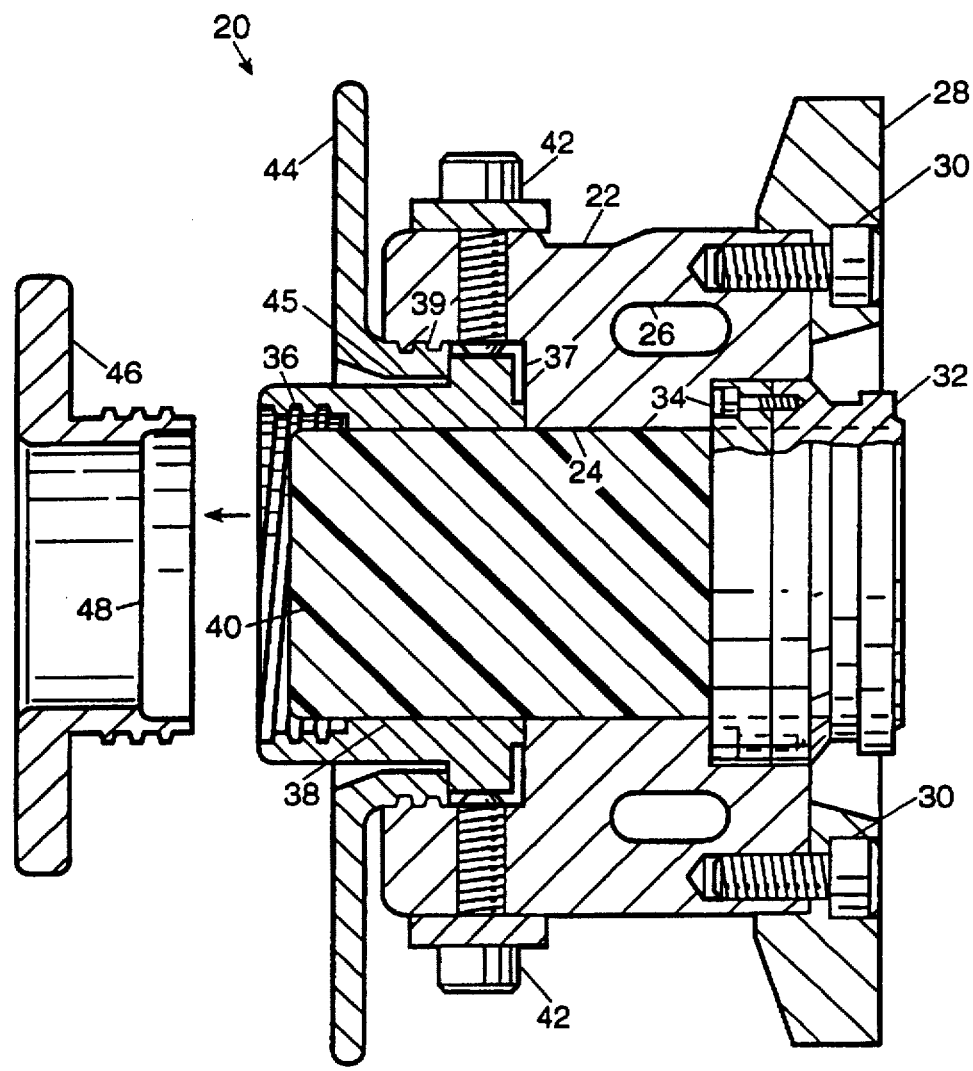
FIG. 3 is a cross-sectional view of a typical extruder head showing a plug of extrudate lodged in the head.

A typical extruder head will first be described with reference to FIG. 3. The extruder head is generally indicated by reference numeral 20 and, during a continuous extrusion process, is normally associated with a barrel which is not shown in the drawings. The barrel, as indicated above, receives raw feed material and normally heats that material to bring it to a plastic state.

The bulk of the head 20 is defined by a housing 22 which defines a cylindrical opening 24 and has a water jacket 26 through which either cold or hot water may flow, as required, to regulate the temperature of extrudate inside the head. The inlet end of the head is drawn to the right of FIG. 3 and the outlet end is drawn to the left.

At the inlet end of the housing 22, an adaptor clamping flange 28 is provided for mating with a flange at the outlet end of the barrel. It is fastened to the extruder head using fasteners 30. A screen pack and breaker plate assembly 32 are seated on a first abutment 34 formed in an annular recess at the inlet end of the housing 22. The screen pack and breaker plate assembly 32 operate to seal the extruder head 20 to the outlet of the barrel and also provide filtration to remove contaminants from the extrudate.

A die clasp retainer 36 is seated on a second abutment 37 formed in a threaded annular recess 39 at the outlet end of the housing 22. The die clasp retainer 36 defines a cylindrical opening 38 which must be carefully aligned with the opening 24 defined in the housing 22 so as to provide a smooth continuous passage for the extrudate which is shown in the drawing as an elastomeric material identified by reference numeral 40. Once aligned, the die clasp retainer 36 is held in position by alignment bolts 42 received in the housing 22 and by a die clasp retaining flange 44 which has a threaded collar 45 that cooperates with a threaded annular recess 39 and is located between the housing 22 and the die clasp retainer 36.

The opening 38 of the die clasp retainer 36 is threaded at the outlet end (drawn to the left of FIG. 3) so as to cooperate with a corresponding threaded collar provided in a die clasp 46. A die cone assembly indicated by numeral 48 is held in the die clasp 46 and operates to orient the rubber extrudate in a directional flow-path through a die which imparts the desired profile to the emerging extrusion (not shown).

To simplify the drawings, a pressure transducer and thermocouple assembly normally provided to monitor the die head pressure and temperature inside the housing 22 have been omitted.

Figure 4:
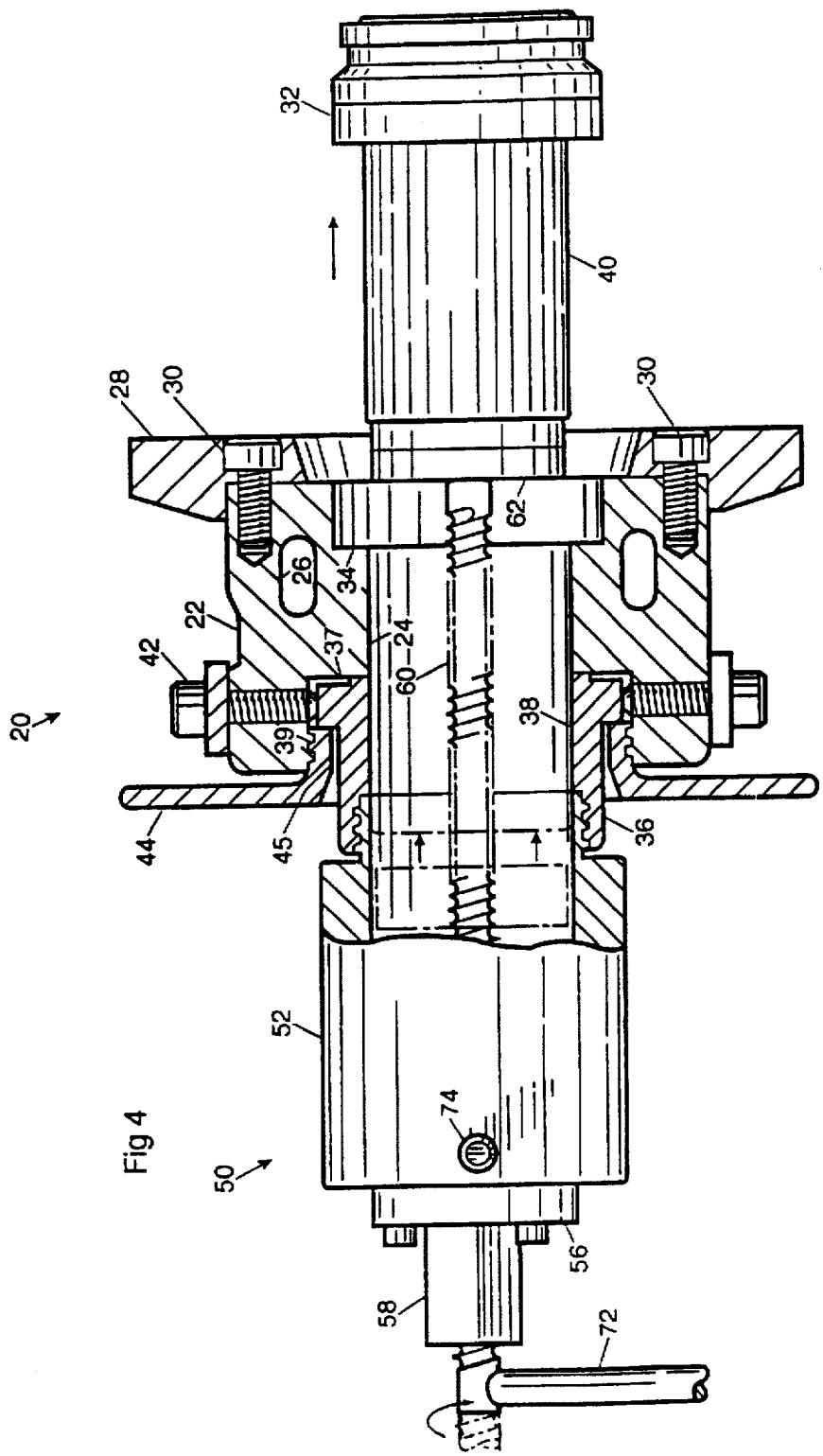
FIG. 4 is a similar view to FIG. 3 showing the tool of FIG. 1 associated with the extruder head with a stop in a retracted position drawn in chain-dotted outline and in an extended position, dislodging a plug of extrudate from the extruder head.

The tool, in accordance with the invention, is indicated by numeral 50 in FIG. 1. The tool 50 comprises a hollow mounting hub 52 which has a threaded collar 53 at an open end (drawn to the right of FIG. 1) and which is adapted to cooperate with the threaded end of the opening 38 of the die clasp retainer 36 in the extruder head 20, as shown in FIG. 4. The other end of the hub is partially closed by an end plate 54 which mates with a flange 56 forming part of a ball-screw housing 58. A rotatable shaft 60, having a ball-screw thread throughout most of its length, extends longitudinally through the end plate 54 into the hub 52 and has a stop 62 (FIG. 2) at one end which is dimensioned to be received inside the hub 52. The stop 62 is circular in cross-section and has an outside diameter substantially equal to the diameter of the openings 24, 38 defined by the extruder head 20.

In the embodiment drawn, the stop 62 is in the form of a thrust bearing comprising a plate 64 joined to the extremity of the shaft 60 and sandwiched between a pair of spring washers 66 captured between two plates 68, 70 secured to each other with bolts 72. Inner plate 68 is apertured to receive the shaft 60 therethrough while outer plate 70 is closed to provide a uniform bearing surface which, in use, will abut on the plug of extrudate 40. At the other end of the shaft 60, there is provided a transversely-extending handle 72 terminating in a knob 73 whereby the shaft may be rotated so as to bring the stop 62 from a retracted position inside the hub 52, as drawn in chain-dotted outline in FIG. 4 to an extended position with the stop 62 emerging from the extruder head 20.

In use, the die clasp 46 and die cone assembly 48 are first removed from the head 20 so that the hub 52 may be fitted to the die clasp retainer 36. Conveniently, a pair of transversely-extending handles 74 are provided for holding the hub 52 and turning it to facilitate mounting of the tool to the head. The stop 62 is then moved forwardly out of the housing by rotating the handle 72 on the shaft and brought into abutment with the plug of extrudate 40. As the stop 62 is thrust outwardly from the hub 52, the extrudate is dislodged from the head together with the screen pack and breaker plate assembly. It is a simple operation taking only minutes.

It will be understood that several variations may be made to the above-described embodiment of the invention within the scope of the appended claims. For example, those skilled in the art will appreciate that the thrust means for reciprocating the plunger comprising the shaft and stop through the hub 52 may take any number of forms and is not limited to the handle as drawn. For example, thrust means may be in the form of a hydraulic, electrical or pneumatic actuator mounted to the shaft. It will also be understood that the thrust bearing may take many forms and is not limited to the construction shown in the drawings.

I claim:

1. Tool for dislodging extrudate from an extruder head defining a longitudinal opening through which extrudate may flow, the opening having a threaded termination for cooperation with a die clasp to retain a die in the extruder head, wherein the tool comprises:

a hollow mounting hub threaded at one end to cooperate with said opening when the die clasp is removed, and adapted to mount the tool to the extruder head;

a plunger having a stop at one end mounted to a shaft extending longitudinally through said mounting hub; and thrust means associated with the plunger and adapted to reciprocate the plunger between a retracted position in which the plunger is housed in the hub and an extended position in which the plunger protrudes from the hub, said plunger being dimensioned to be received in said opening with the stop in abutment with extrudate lodged in the opening and the thrust means being adapted to dislodge extrudate from the extruder head in an extended position of the plunger with the stop remote from the mounting hub.

2. Tool according to claim 1 in which the shaft is rotatable and the stop comprises a thrust bearing whereby the shaft may be rotated relative to the stop.

3. Tool according to claim 2 in which the shaft has a ball screw thread, and a ball screw housing containing balls is mounted to the mounting hub to receive the shaft therethrough.

4. Tool according to claim 2 in which the thrust means comprises a transversely extending handle for rotating the shaft.

5. Tool according to claim 1 in which the mounting hub has a transversely extending handle for grasping the tool and aligning the hub with the die.

6. Tool for dislodging extrudate from an extruder head defining a longitudinal opening through which extrudate may flow, the tool comprising:

a hollow mounting hub adapted to mount the tool to the extruder head;

a plunger having a stop in the form of a thrust bearing at one end mounted to a rotatable shaft having a ball screw thread and extending longitudinally through said mounting hub, a ball screw housing containing balls being mounted to the mounting hub to receive the shaft therethrough; and thrust means associated with the plunger and adapted to reciprocate the plunger between a retracted position in which the plunger is housed in the hub and an extended position in which the plunger protrudes from the hub, said plunger being dimensioned to be received in said opening with the stop in abutment with extrudate lodged in the opening and the thrust means being adapted to dislodge extrudate from the extruder head in an extended position of the plunger with the stop remote from the mounting hub.

7. Tool according to claim 6 in which the thrust means comprises a handle extending transversely from the shaft for rotating the shaft.

8. Tool according to claim 1 in which the mounting hub has a transversely extending handle for grasping the tool and aligning the hub with the extruder head.

* * * * *